(12) United States Patent
Srivastava et al.

(10) Patent No.: US 9,767,178 B2
(45) Date of Patent: Sep. 19, 2017

(54) MULTI-INSTANCE REDO APPLY

(71) Applicant: ORACLE INTERNATIONAL CORPORATION, Redwood Shore, CA (US)

(72) Inventors: Amrish Srivastava, San Ramon, CA (US); Yunrui Li, Fremont, CA (US); Mahesh Baburao Girkar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 25 days.

(21) Appl. No.: 14/067,129

(22) Filed: Oct. 30, 2013

(65) Prior Publication Data

US 2015/0120659 A1 Apr. 30, 2015

(51) Int. Cl.
G06F 17/30 (2006.01)
G06F 11/14 (2006.01)
G06F 11/20 (2006.01)

(52) U.S. Cl.
CPC ........ *G06F 17/30575* (2013.01); *G06F 11/14* (2013.01); *G06F 11/2038* (2013.01);
(Continued)

(58) Field of Classification Search
CPC ......... G06F 17/30575; G06F 17/30289; G06F 17/30292; G06F 2201/80; G06F 11/14;
(Continued)

(56) References Cited

U.S. PATENT DOCUMENTS 4,507,751 A 3/1985 Gawlick et al.
4,710,926 A 12/1987 Brown et al.
(Continued)

FOREIGN PATENT DOCUMENTS

EP 0 503 417 A2 9/1992
EP 2 608 070 A1 6/2013
(Continued)

OTHER PUBLICATIONS

Henk van Houten and Wouter Leibbrandt—"Phase change recording"—Magazine Communications of the ACM—vol. 43 Issue 11, Nov. 2000—pp. 64-71.*

(Continued)

*Primary Examiner* — Anh Ly
(74) *Attorney, Agent, or Firm* — Hickman Palermo Becker Bingham LLP

(57) ABSTRACT

A method, apparatus, and system for multi-instance redo apply is provided for standby databases. A multi-instance primary database generates a plurality of redo records, which are received and applied by a physical standby running a multi-instance standby database. Each standby instance runs a set of processes that utilize non-blocking, single-task threads for high parallelism. At each standby instance for the multi-instance redo, the plurality of redo records are merged into a stream from one or more redo strands in logical time order, distributed to standby instances according to determined apply slave processes using an intelligent workload distribution function, reemerged after receiving updates from remote instances, and applied in logical time order by the apply slave processes. Redo apply progress is tracked at each instance locally and also globally, allowing a consistent query logical time to be maintained and published to service database read query requests concurrently with the redo apply.

31 Claims, 5 Drawing Sheets

(52) U.S. Cl.
CPC ...... *G06F 11/2097* (2013.01); *G06F 11/2094* (2013.01); *G06F 2201/80* (2013.01)

(58) Field of Classification Search
CPC ............. G06F 11/2094; G06F 11/2097; G06F 11/1469; G06F 17/30581; G06F 11/1448; G06F 11/1471; G06F 17/30566; G06F 2201/835; Y10S 707/99955
USPC ....... 707/769, 704, 609, 803, 648, 624, 625, 707/610, 634, 635, 617, 692, E17.005, 707/E17.007, E17.015; 714/4.1, 4.11, 5, 714/4, 6, 46, 57, 48, 47.1, E11.023, 714/E11.024, E11.025, E11.089; 711/41, 711/112, E12.017, E12.002
See application file for complete search history.

(56) References Cited

U.S. PATENT DOCUMENTS

| | | | |
|---|---|---|---|
| 4,782,325 A | 11/1988 | Jeppsson et al. | |
| 4,945,474 A | 7/1990 | Elliott et al. | |
| 5,095,421 A | 3/1992 | Freund | |
| 5,146,571 A | 9/1992 | Logan | |
| 5,182,752 A | 1/1993 | DeRoo et al. | |
| 5,233,618 A | 8/1993 | Glider et al. | |
| 5,241,675 A | 8/1993 | Sheth et al. | |
| 5,263,156 A | 11/1993 | Bowen et al. | |
| 5,287,496 A | 2/1994 | Chen et al. | |
| 5,327,556 A | 7/1994 | Mohan | |
| 5,329,628 A | 7/1994 | Yomamoto et al. | |
| 5,333,265 A | 7/1994 | Orimo et al. | |
| 5,333,316 A | 7/1994 | Champagne et al. | |
| 5,355,477 A | 10/1994 | Strickland et al. | |
| 5,369,757 A | 11/1994 | Spiro et al. | |
| 5,388,196 A | 2/1995 | Pajak et al. | |
| 5,418,940 A | 5/1995 | Mohan | |
| 5,423,037 A | 6/1995 | Hvasshovd | |
| 5,452,445 A * | 9/1995 | Hallmark et al. ..... 707/E17.032 | |
| 5,454,102 A | 9/1995 | Tang et al. | |
| 5,487,164 A | 1/1996 | Kirchhofer et al. | |
| 5,553,279 A | 9/1996 | Goldring | |
| 5,555,404 A | 9/1996 | Torbj.o slashed.rnsen et al. | |
| 5,559,991 A | 9/1996 | Kanfi | |
| 5,574,906 A | 11/1996 | Morris | |
| 5,581,753 A | 12/1996 | Terry et al. | |
| 5,581,754 A | 12/1996 | Terry et al. | |
| 5,588,012 A | 12/1996 | Oizumi | |
| 5,603,024 A | 2/1997 | Goldring | |
| 5,613,113 A | 3/1997 | Goldring | |
| 5,696,775 A | 12/1997 | Nemazie et al. | |
| 5,717,893 A | 2/1998 | Mattson | |
| 5,734,898 A | 3/1998 | He | |
| 5,742,792 A | 4/1998 | Yanai et al. | |
| 5,778,430 A | 7/1998 | Ish et al. | |
| 5,805,799 A | 9/1998 | Fredrickson et al. | |
| 5,806,076 A | 9/1998 | Ngai et al. | |
| 5,870,758 A | 2/1999 | Bamford et al. | |
| 5,870,759 A | 2/1999 | Bauer et al. | |
| 5,870,763 A | 2/1999 | Lomet | |
| 5,893,930 A | 4/1999 | Song | |
| 5,924,096 A | 7/1999 | Draper et al. | |
| 5,956,731 A | 9/1999 | Bamford et al. | |
| 5,960,436 A | 9/1999 | Chang et al. | |
| 5,974,427 A | 10/1999 | Reiter | |
| 5,983,277 A | 11/1999 | Heile et al. | |
| 5,991,771 A | 11/1999 | Falls et al. | |
| 6,009,432 A | 12/1999 | Tarin | |
| 6,009,542 A | 12/1999 | Koller et al. | |
| 6,014,669 A | 1/2000 | Slaughter et al. | |
| 6,026,406 A | 2/2000 | Huang et al. | |
| 6,044,367 A | 3/2000 | Wolff | |
| 6,067,550 A | 5/2000 | Lomet | |
| 6,094,708 A | 7/2000 | Hilla et al. | |
| 6,098,190 A | 8/2000 | Rust et al. | |
| 6,151,607 A | 11/2000 | Lomet | |
| 6,192,377 B1 | 2/2001 | Ganesh et al. | |
| 6,226,650 B1 | 5/2001 | Mahajan | |
| 6,230,210 B1 * | 5/2001 | Davies ................ H04L 41/0233 714/707 |
| 6,272,500 B1 | 8/2001 | Sugita | |
| 6,298,319 B1 | 10/2001 | Heile et al. | |
| 6,298,425 B1 | 10/2001 | Whitaker et al. | |
| 6,324,661 B1 | 11/2001 | Gerbault et al. | |
| 6,353,835 B1 | 3/2002 | Lieuwen | |
| 6,393,485 B1 | 5/2002 | Chao et al. | |
| 6,438,724 B1 | 8/2002 | Cox et al. | |
| 6,446,234 B1 | 9/2002 | Cox et al. | |
| 6,449,623 B1 | 9/2002 | Bohannon et al. | |
| 6,516,327 B1 | 2/2003 | Zondervan et al. | |
| 6,535,869 B1 | 3/2003 | Housel, III | |
| 6,560,743 B2 | 5/2003 | Plants | |
| 6,574,717 B1 | 6/2003 | Ngai et al. | |
| 6,691,139 B2 | 2/2004 | Ganesh et al. | |
| 6,728,879 B1 | 4/2004 | Atkinson | |
| 6,732,125 B1 | 5/2004 | Autrey et al. | |
| 6,804,671 B1 | 10/2004 | Loaiza et al. | |
| 6,839,751 B1 | 1/2005 | Dietz et al. | |
| 6,886,084 B2 | 4/2005 | Kawashima et al. | |
| 6,980,988 B1 | 12/2005 | Demers et al. | |
| 7,024,656 B1 | 4/2006 | Ahad | |
| 7,076,508 B2 | 7/2006 | Bourbonnais et al. | |
| 7,136,970 B2 | 11/2006 | Yoshiya et al. | |
| 7,149,769 B2 | 12/2006 | Lubbers et al. | |
| 7,149,858 B1 | 12/2006 | Kiselev | |
| 7,155,463 B1 | 12/2006 | Wang et al. | |
| 7,222,136 B1 | 5/2007 | Brown et al. | |
| 7,228,354 B2 | 6/2007 | Chambliss et al. | |
| 7,237,027 B1 | 6/2007 | Raccah et al. | |
| 7,246,275 B2 | 7/2007 | Therrien et al. | |
| 7,257,689 B1 | 8/2007 | Baird | |
| 7,287,034 B2 | 10/2007 | Wong et al. | |
| 7,290,017 B1 | 10/2007 | Wang et al. | |
| 7,370,068 B1 | 5/2008 | Pham et al. | |
| 7,464,113 B1 | 12/2008 | Girkar et al. | |
| 7,627,612 B2 | 12/2009 | Ahal et al. | |
| 7,627,614 B2 | 12/2009 | Hu et al. | |
| 7,644,084 B2 | 1/2010 | Rapp | |
| 7,734,580 B2 * | 6/2010 | Lahiri et al. ................. 707/609 |
| 7,761,425 B1 | 7/2010 | Erickson et al. | |
| 7,822,717 B2 | 10/2010 | Kappor et al. | |
| 7,895,216 B2 | 2/2011 | Longshaw et al. | |
| 7,966,293 B1 | 6/2011 | Owara et al. | |
| 7,996,363 B2 | 8/2011 | Girkar et al. | |
| 8,346,929 B1 * | 1/2013 | Lai ........................ G06Q 10/10 709/226 |
| 8,364,648 B1 | 1/2013 | Sim-Tang | |
| 8,433,684 B2 | 4/2013 | Munoz | |
| 8,468,320 B1 | 6/2013 | Stringham | |
| 8,473,953 B2 | 6/2013 | Bourbonnais | |
| 8,478,718 B1 | 7/2013 | Ranade | |
| 8,560,879 B1 | 10/2013 | Goel | |
| 8,838,919 B2 | 9/2014 | Shi et al. | |
| 8,856,484 B2 | 10/2014 | Ben-Tsion et al. | |
| 8,868,492 B2 | 10/2014 | Garin et al. | |
| 8,930,312 B1 | 1/2015 | Rath | |
| 9,026,679 B1 | 5/2015 | Shmuylovich | |
| 9,146,934 B2 | 9/2015 | Hu et al. | |
| 2002/0049950 A1 | 4/2002 | Loaiza et al. | |
| 2002/0091718 A1 | 7/2002 | Bohannon et al. | |
| 2002/0112022 A1 | 8/2002 | Kazar et al. | |
| 2002/0133508 A1 | 9/2002 | LaRue et al. | |
| 2002/0143755 A1 | 10/2002 | Wynblatt et al. | |
| 2002/0165724 A1 | 11/2002 | Blankesteijn | |
| 2003/0046396 A1 | 3/2003 | Richter et al. | |
| 2003/0061537 A1 | 3/2003 | Cha et al. | |
| 2003/0140288 A1 | 7/2003 | Loaiza et al. | |
| 2003/0217071 A1 | 11/2003 | Kobayashi et al. | |
| 2004/0003087 A1 | 1/2004 | Chambliss et al. | |
| 2004/0062106 A1 | 4/2004 | Ramesh et al. | |
| 2004/0193570 A1 | 9/2004 | Yaeger | |
| 2004/0267809 A1 | 12/2004 | East et al. | |
| 2005/0038831 A1 | 2/2005 | Souder et al. | |
| 2005/0055380 A1 | 3/2005 | Thompson et al. | |

(56) References Cited

U.S. PATENT DOCUMENTS

| | | | |
|---|---|---|---|
| 2005/0114409 A1* | 5/2005 | Sinha et al. | 707/203 |
| 2005/0120025 A1 | 6/2005 | Rodriguez et al. | |
| 2005/0165798 A1 | 7/2005 | Cherkauer et al. | |
| 2005/0256861 A1* | 11/2005 | Wong | G06F 17/30575 707/E17.032 |
| 2005/0262170 A1* | 11/2005 | Girkar et al. | 707/204 |
| 2006/0004691 A1 | 1/2006 | Sifry | |
| 2006/0047713 A1 | 3/2006 | Gornshtein | |
| 2006/0064405 A1 | 3/2006 | Jiang et al. | |
| 2006/0101033 A1* | 5/2006 | Hu et al. | 707/100 |
| 2006/0173833 A1 | 8/2006 | Purcell et al. | |
| 2006/0200497 A1 | 9/2006 | Hu et al. | |
| 2006/0212481 A1 | 9/2006 | Stacey et al. | |
| 2006/0224551 A1 | 10/2006 | Lariba-Pey | |
| 2006/0242513 A1 | 10/2006 | Loaiza et al. | |
| 2006/0259468 A1* | 11/2006 | Brooks et al. | 707/3 |
| 2007/0038689 A1 | 2/2007 | Shinkai | |
| 2007/0083505 A1 | 4/2007 | Ferrari et al. | |
| 2007/0100912 A1 | 5/2007 | Pareek et al. | |
| 2007/0156957 A1 | 7/2007 | McHardy et al. | |
| 2007/0226277 A1 | 9/2007 | Holenstein et al. | |
| 2007/0239680 A1 | 10/2007 | Oztekin et al. | |
| 2007/0244918 A1 | 10/2007 | Lee et al. | |
| 2008/0016074 A1 | 1/2008 | Ben-dyke et al. | |
| 2008/0059492 A1 | 3/2008 | Tarin | |
| 2008/0104283 A1 | 5/2008 | Shin et al. | |
| 2008/0126846 A1 | 5/2008 | Vivian et al. | |
| 2008/0147599 A1 | 6/2008 | Young-Lai | |
| 2008/0177803 A1 | 7/2008 | Fineberg et al. | |
| 2008/0222311 A1 | 9/2008 | Lee | |
| 2008/0228835 A1 | 9/2008 | Lashley et al. | |
| 2008/0235294 A1* | 9/2008 | Girkar et al. | 707/202 |
| 2008/0244209 A1 | 10/2008 | Seelam et al. | |
| 2008/0256143 A1 | 10/2008 | Reddy et al. | |
| 2008/0256250 A1 | 10/2008 | Wakefield | |
| 2008/0281784 A1 | 11/2008 | Zane et al. | |
| 2008/0281865 A1 | 11/2008 | Price et al. | |
| 2009/0024384 A1 | 1/2009 | Kobayashi et al. | |
| 2009/0034377 A1 | 2/2009 | English et al. | |
| 2009/0037422 A1* | 2/2009 | Wong | G06F 17/30575 707/E17.032 |
| 2009/0037494 A1* | 2/2009 | Wong et al. | 707/202 |
| 2009/0063591 A1 | 3/2009 | Betten et al. | |
| 2009/0119295 A1 | 5/2009 | Chou et al. | |
| 2009/0268903 A1 | 10/2009 | Bojinov et al. | |
| 2009/0307290 A1 | 12/2009 | Barsness et al. | |
| 2010/0036810 A1* | 2/2010 | Wu et al. | 707/3 |
| 2010/0036831 A1* | 2/2010 | Vemuri | G06F 17/30516 707/707 |
| 2010/0036843 A1 | 2/2010 | MacNaughton et al. | |
| 2010/0082648 A1 | 4/2010 | Potapov | |
| 2010/0122026 A1 | 5/2010 | Umaamageswaran et al. | |
| 2010/0145909 A1 | 6/2010 | Ngo | |
| 2010/0198920 A1* | 8/2010 | Wong | G06F 9/544 709/206 |
| 2010/0211577 A1 | 8/2010 | Shimuzu et al. | |
| 2010/0235335 A1 | 9/2010 | Heman et al. | |
| 2010/0250549 A1 | 9/2010 | Muller et al. | |
| 2010/0257399 A1* | 10/2010 | Brown | H04L 69/40 714/4.1 |
| 2010/0318570 A1 | 12/2010 | Narasinghanallur et al. | |
| 2011/0004586 A1 | 1/2011 | Cherryholmes et al. | |
| 2011/0010392 A1* | 1/2011 | Wong et al. | 707/776 |
| 2011/0029569 A1 | 2/2011 | Ganesh et al. | |
| 2011/0060724 A1* | 3/2011 | Chan | G06F 11/1469 707/683 |
| 2011/0066791 A1 | 3/2011 | Goyal et al. | |
| 2011/0087633 A1 | 4/2011 | Kreuder et al. | |
| 2011/0087637 A1 | 4/2011 | Sundaram et al. | |
| 2011/0099179 A1 | 4/2011 | Balebail | |
| 2011/0138123 A1 | 6/2011 | Gurajada et al. | |
| 2011/0145207 A1 | 6/2011 | Agrawal et al. | |
| 2011/0231362 A1 | 9/2011 | Attarde et al. | |
| 2011/0307450 A1 | 12/2011 | Hahn et al. | |
| 2012/0054158 A1* | 3/2012 | Hu et al. | 707/692 |
| 2012/0054533 A1* | 3/2012 | Shi et al. | 707/610 |
| 2012/0109926 A1 | 5/2012 | Novik et al. | |
| 2012/0173515 A1 | 7/2012 | Jeong et al. | |
| 2012/0239697 A1* | 9/2012 | Ram | G06F 17/30578 707/781 |
| 2012/0278282 A1 | 11/2012 | Lu | |
| 2012/0284228 A1 | 11/2012 | Ghosh | |
| 2012/0323849 A1 | 12/2012 | Garin et al. | |
| 2012/0323971 A1 | 12/2012 | Pasupuleti | |
| 2013/0085742 A1 | 4/2013 | Baker et al. | |
| 2013/0117237 A1 | 5/2013 | Thomsen et al. | |
| 2013/0198133 A1 | 8/2013 | Lee | |
| 2013/0212068 A1 | 8/2013 | Talius et al. | |
| 2014/0040218 A1 | 2/2014 | Kimura et al. | |
| 2014/0059020 A1 | 2/2014 | Hu et al. | |
| 2014/0075493 A1 | 3/2014 | Krishnan et al. | |
| 2014/0095452 A1 | 4/2014 | Lee et al. | |
| 2014/0095530 A1 | 4/2014 | Lee et al. | |
| 2014/0095546 A1 | 4/2014 | Kruglikov et al. | |
| 2014/0164131 A1 | 6/2014 | Li et al. | |
| 2015/0032694 A1 | 1/2015 | Rajamani et al. | |
| 2015/0088811 A1 | 3/2015 | Hase et al. | |
| 2015/0088822 A1 | 3/2015 | Raja et al. | |
| 2015/0088824 A1 | 3/2015 | Kamp et al. | |
| 2015/0088830 A1 | 3/2015 | Kamp et al. | |
| 2015/0088926 A1 | 3/2015 | Chavan et al. | |
| 2015/0089125 A1 | 3/2015 | Mukherjee et al. | |
| 2015/0089134 A1 | 3/2015 | Mukherjee et al. | |
| 2015/0120659 A1 | 4/2015 | Srivastava et al. | |
| 2015/0254240 A1 | 9/2015 | Li et al. | |
| 2016/0179867 A1 | 6/2016 | Li et al. | |

FOREIGN PATENT DOCUMENTS

| | | |
|---|---|---|
| GB | 1 332 631 A | 10/1973 |
| GB | 2505 185 A | 2/2014 |
| JP | 59-081940 | 5/1984 |
| JP | 02-189663 | 7/1990 |
| JP | 08-235032 | 9/1996 |
| JP | 10-040122 | 2/1998 |
| JP | 10-240575 | 9/1998 |
| WO | WO 2007/078444 A1 | 7/2007 |

OTHER PUBLICATIONS

Chi-Yi Lin, Szu-Chi Wang and Sy-Yen Kuo—"An Efficient Time-Based Checkpointing Protocol for Mobile Computing Systems over Mobile IP"—Mobile Networks and Applications 8, pp. 687-697, 2003—2003 Kluwer Academic Publishers. Manufactured in The Netherlands.*

Teschke, et al., "Concurrent Warehouse Maintenance Without Comprising Session Consistency", 1998, 10 pages.

Vassilakis et al., "Implementation of Transaction and Concurrency Control Support in a Temporal DBMS" Information Systems, vol. 23, No. 5, 1998, 16 pages.

Bober et al., "On Mixing Queries and Transactions Via Multiversion Locking", IEEE, 1992, 11 pages.

Mohan et al., "Efficient and Flexible Methods for Transient Versioning of Records to Avoid Locking by Reading-Only Transactions", XP000393583, IBM Almaden Research Center, Dated Feb. 6, 1992, 11 pages.

Rajeev Kumar et al., Oracle DBA, A Helping Hand, Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

Oracle Help Center, "Database 2 Day + Data Replication and Integration Guide", 3 Accessing and Modifying Information in Multiple Databases, dated 2016, 14 pages.

Oracle Base, Multitenant: Create and Configure a Pluggable Database (PDB) in Oracle Database 12c Release 1 (12.1), dated Jan. 8, 2014, 16 pages.

Muhammad Anwar, "How to Install Oracle 12c Multitenant Pluggable Database", Dated Feb. 24, 2012, 27 pages.

(56) References Cited

OTHER PUBLICATIONS

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for the Cloud", 3rd Edition, Microsoft, 2012, 246 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

Zhe, Li, et al., "PERF join: an alternative to two-way semijoin and Bloomjoin" Proceedings of the 1995 ACM, New York. NY, US., 1995, pp. 187-144.

Shao et al., "Clotho: Decoupling Memory Page Layout from Storage Organization", Proceedings of the 30th VLDB Conference, Toronto, Canada, 2004, 12 pages.

Schaffner et al., "A Hybrid Row-Column OLTP Database Architecture for Operational Reporting", dated Aug. 24, 2008, 14 pages.

Ramamurthy, Ravishankar, "A Case for Fractured Mirrors" Proceedings of the 28th VLDB Conference, dated, 2002, 12 pages.

Phipps, Colin:, "Mapping Deflated Files", Internet Article, dated Jan. 6, 2013, http://zsync.moria.org.uk/paper/ch03s02.html, 3 pages.

Oracle Database Administrator's Guide, 11g Release 2 (11.2), Chapter 26, Feb. 2010, 54 pages. http://download.oracle.com/docs/cd/E11882_01/server.112/e10595.pdf.

Oracle Database Administrator's Guide, 10g Release 2 (10.2), Chapter 24, May 2006, 34 pages. http://download.oracle.com/docs/cd/B19306_01/server.102/b14231.pdf.

O'Neil, P., et al., "Multi-table joins through bitmapped join indices", SIGMOD Record, ACM, New York, NY, US, vol. 24, No. 3, Sep. 1, 1995, pp. 8-11, ISSN: 01635808.

Nirmesh, Malviya, "Recovery Algorithms for In-Memory OLTP Databases", Master of Science Thesis, dated Jul. 1, 2012, 66 pages.

Loizos, M., et al., "Improving distributed join efficiency with extended bloom filter operations", Advanced Networking and Applications, 2007. AINA '07., 21st international Conf. IEEE, May 1, 2007.

Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.

IBM, "A Scheduling Algorithm for Processing Mutually Exclusive Workloads in a Multi-System Configuration", dated Aug. 19, 2002, IEEE, 3 pages.

Zhang Ho et al., "In-Memory Big Data Management and Processing: A Survey", IEEE Transactions on Knowledge and Data Engineering, vol. 27, No. 7, dated Jul. 31, 2015, 30 pages.

Vishal Sikka et al., "Efficient Transaction Processing in SAP Hana Database", Proceedings of the 2012, International Conference on Management of Data, dated Jan. 31, 2012, 12 pages.

Farber et al., "SAP HANA Database—Data Management for Modern Business Applications", SIGMOD Record, dated Dec. 2011, vol. 40, No. 4, 8 pages.

Khalid Sayood:, "Introduction to data Compression", Morgan Kaufmann Publisher, dated Dec. 1996, 4 pages.

Antoni Cau, et al., "Specifying Fault Tolerance within Stark's Formalism," 1993, IEEE, pp. 392-401.

IBM Corp., "IBM OS/2 Extended Edition Configuration," Feb. 1990, IBM Technical Disclosure Bulletin, vol. 32, No. 9B, pp. 446-451.

* cited by examiner

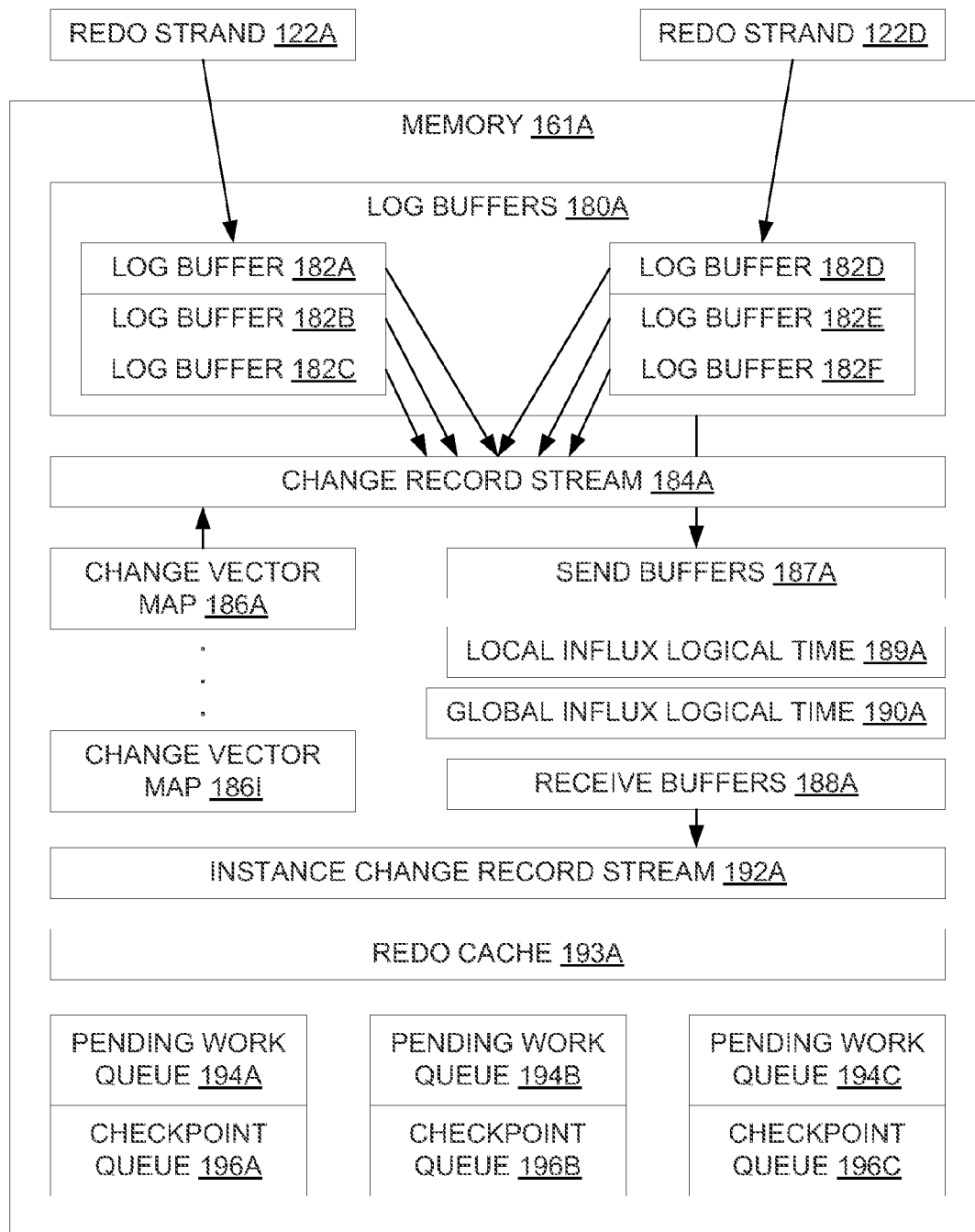

202
STORE A PLURALITY OF CHANGE RECORDS RECEIVED FROM ONE OR MORE PRIMARY INSTANCES FOR A PRIMARY MULTI-INSTANCE DATABASE

204
MAKE DETERMINATIONS OF HOW TO ASSIGN SAID PLURALITY OF CHANGE RECORDS TO SAID PLURALITY OF APPLY PROCESSES, EACH DETERMINATION OF SAID DETERMINATIONS ASSIGNING EACH CHANGE RECORD OF SAID PLURALITY OF CHANGE RECORDS TO AN APPLY PROCESS OF SAID PLURALITY OF APPLY PROCESSES

206
ACCORDING TO SAID DETERMINATIONS, THE RESPECTIVE SENDER PROCESS OF SAID PLURALITY OF SENDER PROCESSES RUNNING ON EACH SAID STANDBY INSTANCE DISPATCHING EACH CHANGE RECORD OF AT LEAST OF A PORTION OF SAID PLURALITY OF CHANGE RECORDS TO A STANDBY INSTANCE ON WHICH THE APPLY PROCESS ASSIGNED TO SAID EACH CHANGE RECORD RUNS

208
EACH RECEIVER PROCESS OF SAID PLURALITY OF RECEIVER PROCESSES RECEIVING DISPATCHED CHANGE RECORDS DISPATCHED TO SAID EACH RECEIVER PROCESS BY A SENDER PROCESS RUNNING ON A STANDBY INSTANCE DIFFERENT THAN THE STANDBY INSTANCE ON WHICH SAID RECEIVER PROCESS RUNS

210
EACH STANDBY INSTANCE OF SAID PLURALITY OF STANDBY INSTANCES ORDERING A RESPECTIVE PLURALITY OF ASSIGNED CHANGE RECORDS ASSIGNED TO AN APPLY PROCESS RUNNING ON SAID EACH STANDBY INSTANCE, SAID ORDERING MADE ACCORDING TO A LOGICAL TIME ASSOCIATED WITH EACH ASSIGNED CHANGE RECORD OF SAID PLURALITY OF ASSIGNED CHANGE RECORDS, SAID RESPECTIVE PLURALITY OF ASSIGNED CHANGE RECORDS INCLUDING DISPATCHED CHANGE RECORDS RECEIVED BY A RECEIVER PROCESS OF SAID PLURALITY OF RECEIVER PROCESSES RUNNING ON SAID EACH STANDBY INSTANCE TRANSMITTED BY A SENDER PROCESS OF SAID PLURALITY OF SENDER PROCESSES RUNNING ON A DIFFERENT STANDBY INSTANCE OF SAID PLURALITY OF STANDBY INSTANCES

212
EACH STANDBY INSTANCE OF SAID PLURALITY OF STANDBY INSTANCES DISTRIBUTING EACH ASSIGNED CHANGE RECORD OF SAID RESPECTIVE PLURALITY OF ASSIGNED CHANGE RECORDS TO THE ASSIGNED APPLY PROCESS OF SAID EACH ASSIGNED CHANGE RECORD

MULTI-INSTANCE REDO APPLY

FIELD OF THE INVENTION

The present disclosure relates to databases, and more specifically, to multi-instance redo apply for databases.

BACKGROUND

For many database configurations, it is desirable to have a physical replica or a physical standby that replicates the data from one or more primary or production databases. By maintaining a standby database as a replicated copy of a primary database, the physical standby can provide data protection and redundancy through features such as database recovery, database failover, and test databases. Moreover, since many database workloads are biased towards a higher ratio of read queries compared to writes, the physical standby can also offload database read queries from the primary database, reducing processing burdens on production servers.

To address big data processing demands in the modern enterprise, many databases have migrated to multi-instance or multi-node database configurations. As a result, a significant volume of change records or redo records is generated for the primary database. The speed by which these redo records are applied on the standby database has a direct impact on key database performance metrics such as mean time to recovery and replication lag time.

On the other hand, the physical standby is often configured to apply redo as a single-node process, even when the physical standby is multi-node. The redo apply is thus unable to efficiently utilize all available hardware resources to keep pace with the large volume of redo records generated from the multi-node primary database. Accordingly, a single-node redo apply may become a serious performance bottleneck for the physical standby, negatively impacting database availability and query response times.

Based on the foregoing, there is a need for a method to provide an efficient and high performance redo apply for a physical standby.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1C is a block diagram that depicts an example memory of a standby instance within a physical standby using multi-instance redo apply, according to an embodiment;

FIG. 2 is a flow diagram that depicts a process for providing multi-instance redo apply for a standby database, according to an embodiment;

DETAILED DESCRIPTION

Figure 1A:
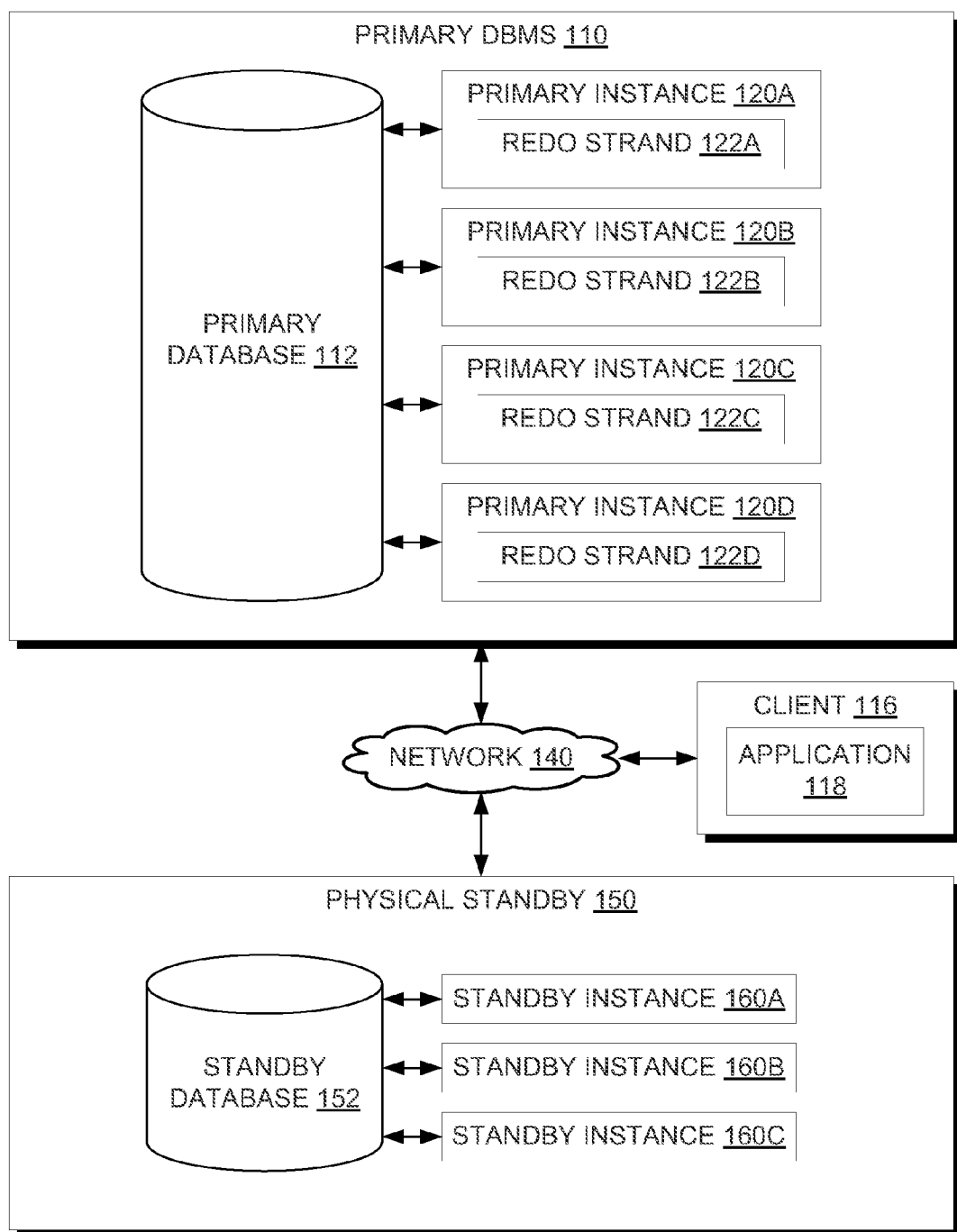
FIG. 1A is a block diagram that depicts an example database system with a physical standby using multi-instance redo apply, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, multi-instance redo apply is provided for standby databases. A multi-instance primary database generates a plurality of redo records, which are received and applied by a physical standby running a multi-instance standby database. Each standby instance runs a set of processes that utilize non-blocking, single-task threads, providing a high degree of parallelism for optimal resource utilization during the redo apply. The standby instance that initiates the redo apply may be specified as the master coordinator instance to enforce any required synchronization tasks, which may be marked using metadata markers embedded in the plurality of redo records. The multi-instance redo apply may also dynamically load-adjust in response to changes to the number of standby instances or the number of primary databases.

At each standby instance or apply instance for the multi-instance redo, the plurality of redo records are merged into a stream from one or more redo strands in logical time order, distributed to standby instances according to determined apply slave processes, reemerged after receiving updates from remote instances, and applied in logical time order by the apply slave processes. Redo apply progress is tracked at each instance locally and also globally, allowing a consistent query logical time to be maintained and published. Accordingly, the physical standby can remain open to service database read query requests concurrently with the redo apply.

By using an intelligent workload distribution function when determining the apply slave processes for the redo records, communication overhead between standby instances can be minimized. As a result, the multi-instance redo apply can provide high performance to keep pace with the large workload of redo records generated by one or more multi-instance primary databases.

Database Systems

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

A database block, also referred to as a data block, is a unit of persistent storage. A database block is used by a database server to store database records (e.g. to store rows of a table, to store column values of a column). When records are read from persistent storage, a database block containing the record is copied into a database block buffer in volatile memory of a database server. A database block usually contains multiple rows, and control and formatting information, (e.g. offsets to sequences of bytes representing rows or other data structures, list of transactions affecting a row). A database block may be referenced by a database block address (DBA).

A database block is referred to as being atomic because, at least in part, a database block is the smallest unit of database data a database server may request from a persistent storage device. For example, when a database server seeks a row that is stored in a database block, the database server may only read the row from persistent storage by reading in the entire database block.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

System Overview

FIG. 1A is a block diagram that depicts an example database system with a physical standby using multi-instance redo apply, according to an embodiment. System 100 of FIG. 1A includes primary database management system (DBMS) 110, client 116, network 140, and physical standby 150. Primary DBMS 110 includes primary database 112, primary instance 120A, primary instance 120B, primary instance 120C, and primary instance 120D. Primary instance 120A includes redo strand 122A, primary instance 120B includes redo strand 122B, primary instance 120C includes redo strand 122C, and primary instance 120D includes redo strand 122D. Client 116 includes application 118. Physical standby 150 includes standby database 152, standby instance 160A, standby instance 160B, and standby instance 160C.

It should be noted that FIG. 1A only shows one specific embodiment with a single primary DBMS 110, a single physical standby 150, a single network 140, and a single client 116. In other embodiments, any number of primary DBMSs, physical standbys, networks, and clients may be supported. Additionally, while network 140 is shown outside of primary DBMS 110 and physical standby 150, network 140 may also encompass private intranets or other communications links within primary DBMS 110 and/or physical standby 150. Further, each primary DBMS may have any number of primary instances, and each physical standby may have any number of standby instances, which may also be dynamically added and removed during redo apply.

As shown in FIG. 1A, primary DBMS 110 is a multi-instance or multi-node DBMS, where multiple primary instances 120A-120D are concurrently applying changes to data in primary database 112. Thus, a particular data block or block address of primary database 112 may be modified at different times by different primary instances. For the purposes of an example, primary DBMS 110 utilizes a shared everything primary database 112. Changes applied by primary instances 120A-120D are logged as redo records within respective redo strands 122A-122D. In some embodiments, a primary instance may log multiple redo strands.

As discussed above, a physical standby may be configured to only utilize a single standby instance for redo apply, which may provide insufficient performance to keep pace with the volume of redo records from redo strands 122A-122D. Physical standby 150 therefore utilizes multiple standby instances 160A-160C to replicate the contents of primary database 112 into standby database 152. Since the redo records are received, processed, and applied across multiple standby instances 160A-160C, the redo apply is not bottlenecked at any one particular instance.

Other approaches for multi-instance redo apply may also require exclusive access to standby database 152, precluding any concurrent opening of standby database 152 to offload database read queries from primary database 112. Thus, database clients such as client 116 are forced to either wait for the redo apply to reach and stop at a checkpoint, or to query primary database 112 directly, placing a heavier burden on production servers.

Additionally, physical standby 150 may utilize an intelligent workload distribution function to minimize such communications overhead. For example, the distribution function may assign redo records according to affinity to a particular instance, according to grouping of contiguous block addresses, or according to whether the changes in the redo records are independent of any existing database contents. These and other optimizing criteria can be combined with a hash function to provide an intelligent workload distribution function that approximates an even distribution of the workload while reducing communications overhead. Accordingly, the performance of the multi-instance redo apply can keep pace with the large volume of redo records generated by a multi-node primary DBMSs such as primary DBMS 110, accelerating recovery operations and helping to minimize database replication lag time.

Physical standby 150 further tracks the ongoing global progress of the redo apply, and can therefore determine a consistent state or a current logical time of standby database 152 at any requested query time. Accordingly, standby database 152 can remain open to service database read query requests from database clients, such as from application 118 of client 116, even during redo apply. In this manner, physical standby 150 can provide efficient replication while concurrently offloading database read queries, thereby helping to reduce the read workload on the production servers of primary DBMS 110.

Multi-Instance Redo Apply Process

With a basic outline of system 100 now in place, it may be instructive to review a high level overview of the processing steps to provide multi-instance redo apply for a standby database. Turning to FIG. 2, FIG. 2 is a flow diagram that depicts a process 200 for providing multi-instance redo apply for a standby database, according to an embodiment. Prior to process 200, it is assumed that the standby database includes a plurality of standby instances, each running at least 1) an apply process of a plurality of apply processes to apply change records to the standby database, 2) a sender process of a plurality of sender processes to transmit change records to a least one receiver process of a plurality of receiver processes, and 3) a receiver process of said plurality of receiver processes to receive change records transmitted by at least one sender process of said plurality of sender processes to said receiver process.

Storing Change Records

At block 202 of process 200, referring to FIG. 1A, physical standby 150 stores a plurality of change records received from primary instances 120A-120D for primary DBMS 110. Block 202 may begin in response to a recovery request issued on standby instance 160A, which may be manually invoked by a database administrator or automatically invoked to provide standby replication for primary DBMS 110. In the example shown in FIG. 1A, the plurality of change records comprise multiple sets of redo records that are stored in logical time order within respective redo strands 122A-122D, which are transferred to and received by physical standby 150. In an embodiment, the logical time may correspond to a logical timestamp, a non-limiting example of which is a System Commit Number (SCN).

Physical standby 150 may use various methods to distribute the redo strands to the available standby instances 160A-160C. One method is to assign redo strands to standby instances in a round robin fashion. In the case where the number of standby instances matches the number of primary instances, then each standby instance will receive exactly one redo strand. However, as shown in the example of FIG. 1A, there are only three (3) standby instances for four (4) primary instances having four (4) redo strands. In this case, the round robin distribution will attempt to assign the redo strands as evenly as possible, but some standby instances may be assigned a larger number of redo strands than other standby instances.

Further, since physical standby 150 may support multiple primary DBMSs, existing redo strands from other primary databases may already be assigned to some standby instances. The assigning of redo strands 122A-122D may therefore attempt to load balance the workload for each standby instance. For example, new redo strands may be assigned to balance the count of redo strands for each standby instance, preferring standby instances that have smaller numbers of existing assigned redo strands. While balancing redo strand counts assumes that the redo strands present approximately equal workloads, some embodiments may load balance by estimating the actual workloads of each redo strand, for example by estimating the rate of generated changes.

Once a distribution for the redo strands to the standby instances is decided, the redo strands may be transferred and stored in memory, disk, or other storage of each of the standby instances. In some embodiments, the storage may be shared between multiple standby instances. The transferring of the redo strands 122A-122D from primary DBMS 110 to physical standby 150 over network 140 may be by streaming redo records as they are created, by pushing periodic batch updates, by pulling updates via periodic polling, or by any another method.

In some embodiments, the redo strands may not be individually accessible and primary DBMS 110 may merge redo strands 122A-122D into a single consolidated log. In this case, physical standby 150 may receive and split the single consolidated log back into separate redo strands according to primary instances. In embodiments where primary instances may record multiple redo strands, the redo strands may be merged and consolidated per primary instance, either by primary DBMS 110 or by physical standby 150.

Reading and Validating Redo Strands

At block 204 of process 200, referring to FIG. 1A, physical standby 150 makes determinations of how to assign the change records stored in block 202 to said plurality of apply processes. More specifically, standby instances 160A-160C make determinations on how to assign the change records from redo strands 122A-122D to a plurality of apply processes. Before these determinations take place, the change records provided by block 202 may be divided into fixed sized log buffers for parallel processing and also combined into merged change record streams to accommodate processing of multiple redo strands for each standby instance.

Figure 1B:
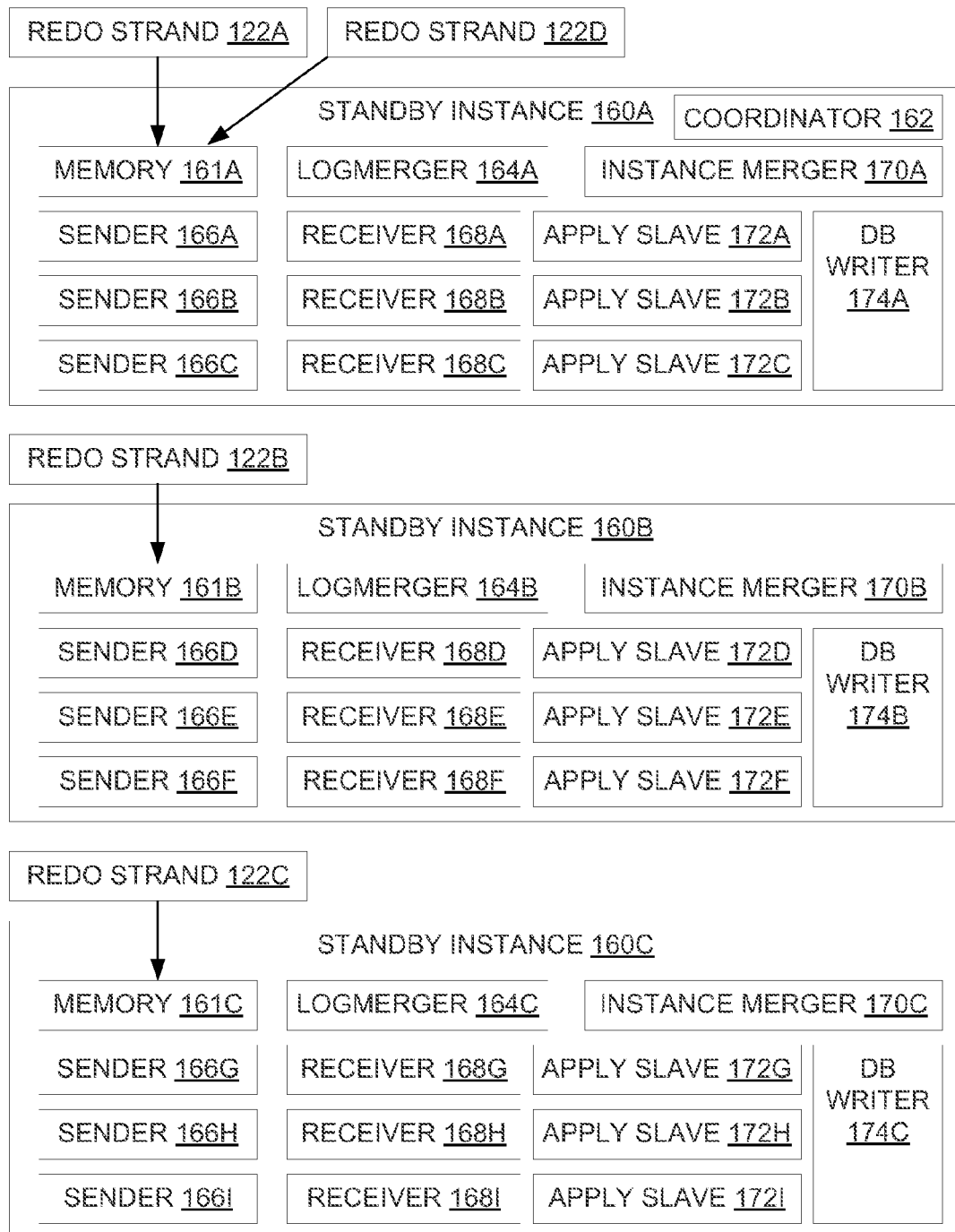
FIG. 1B is a block diagram that depicts example standby instances for multi-instance redo apply, according to an embodiment.

Referring to FIG. 1B, FIG. 1B is a block diagram that depicts example standby instances for multi-instance redo apply, according to an embodiment. System 102 of FIG. 1B includes standby instances 160A-160C and redo strands 122A-122D, which may correspond to the same numbered elements from FIG. 1A. Standby instance 160A includes memory 161A, coordinator 162, logmerger 164A, sender 166A, sender 166B, sender 166C, receiver 168A, receiver 168B, receiver 168C, instance merger 170A, apply slave 172A, apply slave 172B, apply slave 172C, and DB writer 174A. Standby instance 160B includes memory 161B, logmerger 164B, sender 166D, sender 166E, sender 166F, receiver 168D, receiver 168E, receiver 168F, instance merger 170B, apply slave 172D, apply slave 172E, apply slave 172F, and DB writer 174B. Standby instance 160C includes memory 161C, logmerger 164C, sender 166G, sender 166H, sender 166I, receiver 168G, receiver 168H, receiver 168I, instance merger 170C, apply slave 172G, apply slave 172H, apply slave 172I, and DB writer 174C. With respect to FIG. 1B, like numbered elements may correspond to the same elements from FIG. 1A.

In FIG. 1B, redo strands 122A, 122B, 122C and 122D are shown as being received and stored directly into memory 161A, 161B, 161C and 161A, respectively. However, in some embodiments, redo strands 122A-122D may first be placed in intermediate storage, such as a disk volume. Thus, each standby instance may include an independent storage volume to receive the redo strands assigned for each respective standby instance. In some embodiments, a single shared volume may receive multiple redo strands that are accessible by multiple standby instances.

Logmergers 164A-164C are processes that are responsible for reading and combining the redo strands into merged streams for each standby instance. These merged streams can then be processed to generate change vector maps directing the change records to specific apply slaves. Focusing on standby instance 160A in particular, logmerger 164A reads redo strands 122A and 122D into memory 161A.

To provide details for exemplary in-memory data structures, FIG. 1C is a block diagram that depicts an example memory of a standby instance within a physical standby using multi-instance redo apply, according to an embodiment. System 104 of FIG. 1C includes redo strand 122A, redo strand 122D, and memory 161A. Memory 161A includes log buffers 180A, change record stream 184A, change vector map 186A to 186I, send buffers 187A, receive buffers 188A, local influx logical time 189A, global influx logical time 190A, instance change record stream 192A, redo cache 193A, pending work queue 194A, pending work queue 194B, pending work queue 194C, checkpoint queue 196A, checkpoint queue 196B, and checkpoint queue 196C. Log buffers 180A include log buffer 182A, log buffer 182B, log buffer 182C, log buffer 182D, log buffer 182E, and log buffer 182F. With respect to FIG. 1C, like numbered elements may correspond to the same elements from FIG. 1B.

In an embodiment, each logmerger 164A-164C may be a multi-threaded process. Accordingly, to segment the workload for parallel processing, redo strands 122A-122D may be loaded into fixed size log buffers. The size of the log buffers may be configured such that each thread of the logmergers can complete a processing step for an entire log buffer within a certain quantum of processing time, for example 1 megabyte for 1 quantum. Thus, referring to FIG. 1C, log buffers 182A-182C may each correspond to 1 megabyte log buffers for redo strand 122A, whereas log buffers 182D-182F may each correspond to 1 megabyte log buffers for redo strand 122D. While three log buffers are shown for each redo strand in FIG. 1C, the number of log buffers can be configured to any value according to buffer sizes and desired parallelism. Thus, the number of log buffers is not necessarily related to the number of standby instances. Processing steps for log buffers 180A may include 1) reading redo strands 122A and 122D from storage into memory 161A, and 2) validating log buffers 180A by calculating and verifying checksums or other embedded integrity checks. By running these steps on separate threads, non-blocking asynchronous I/O can be achieved.

The number of buffers that can be reserved for a redo strand may be unbounded, allowing all available redo records to be loaded into memory. However, to avoid wasteful reads beyond the end of redo applied on the physical standby, some embodiments may employ limits on the number of buffers available to allocate for a particular redo strand. Thus, if it is determined that the end of a standby online log has been reached, for example by examining the logical time of the last redo record in the last read buffer, then any reading into additional buffers for that redo strand may be prevented until a full buffer can be read. Some embodiments may also limit the number of available buffers for memory management purposes.

To reclaim memory from buffers that are no longer needed, the apply slave dependencies for each buffer in log buffers 180A may be tracked. When all change records within a particular log buffer are no longer needed by any apply slaves, then that particular log buffer may be freed from memory or marked as available ("unused"), allowing logmerger 164A to read and validate new change records from the redo strands into the newly available buffer.

Merging Redo Strands

After the buffers are read and validated, the buffers are ready to be parsed and merged together by a merge thread of each logmerger. Since each of the redo strands is already in ascending logical time order, logmerger 164A only needs to merge the log buffers in logical time order across redo strands 122A and 122D, rather than conducting a full re-sort operation. As a result, a single merged stream of change records may be provided, or change record stream 184A. In the case where there is only one redo strand, such as with standby instances 160B and 160C, no merge operation is necessary and the stream can be provided by sequencing the change records directly from the log buffers.

Determining the Distribution Function

Once logmerger 164A-164C of respective standby instances 160A-160C provide the stream of change records, determinations of how to assign the change records in the streams to apply slaves 172A-172I are made. For logmerger 164A of standby instance 160A, the change records in change record stream 184A are each assigned to one of apply slaves 172A-172I based on a distribution function. To avoid communications overhead, all standby instances may be configured to utilize the same distribution function that deterministically assigns a particular change record to a particular apply slave. Thus, each standby instance 160A-160C can independently determine how to distribute their respective change record streams. Note that the determinations happen dynamically during run-time and not at the beginning of process 200.

Change records that modify the same data in a database may be restricted to be assigned to the same apply slave. Such change records may be identified by the change records modifying the same database block address (DBA), for example. By enforcing this restriction on the distribution function, each apply slave can independently guarantee correct apply ordering, since change records for a particular DBA will always be assigned to the same apply slave.

If the sole consideration for the distribution function is an even distribution of change records to N apply slaves, wherein N=9 for FIG. 1B, then a hash function will suffice for the distribution function, for example "DBA modulo N". However, as the number of instances or nodes increases, a simple hash function will tend to favor apply slaves on remote instances. Since the change record must then be sent to the remote instance for processing, increased communications overhead between instances may negatively impact performance.

Accordingly, the distribution function may be based on a hash function, but with further modifications to consider data access locality. Thus, the distribution function may distribute to apply slaves based on an affinity to a standby instance that runs the apply slave. For example, in some embodiments, each standby instance may maintain a separate undo tablespace. In this case, it would be advantageous to have redo records processed according to undo tablespace affinity to a particular standby instance. Thus, the distribution function may send change records to a standby instance according to the DBA and/or the database file containing the DBA having affinity to an undo tablespace for that standby instance. Affinity to particular standby instances may also use any other criteria besides undo tablespaces.

Additionally, since data modifications may tend to exhibit spatial locality in many applications, it would be advantageous to have contiguous ranges of data assigned to particular standby instances. A hash function applied to each individual DBA would tend to distribute adjacent DBAs to different standby instances. Accordingly, rather than applying the distribution function to each individual DBA, the distribution function may be applied to send contiguous DBA ranges of redo records to each standby instance. As a result, each standby instance is provided with more opportunities to coalesce writes for greater I/O performance.

Yet further, direct loads or bulk loads that include the complete contents for updating a database block may be applied only by the local instance where it is encountered, preventing wasteful sending of change records. Typically, a change record might only modify a portion of a database block, whereas change records for direct loads replace the entire contents of the database block. Since the change records for direct loads are independent of any existing database contents or prior changes, the changes can be written directly without reading the existing database block or integrating any prior changes. However, to ensure that future changes are ordered correctly with respect to the direct load, the start of a direct load may be accompanied by a metadata marker for synchronization, forcing all standby instances to apply only up to the logical time of the direct load before the direct load is applied. The metadata markers may also be used to maintain undo tablespace information for determining standby instance affinity. A more detailed description of such metadata markers is provided below under the heading "METADATA MARKERS".

Accordingly, by determining a distribution function based on a hash function that further integrates any number of optimization factors including the factors described above, an intelligent distribution function can be provided for an even distribution of change records while optimizing for data access locality. As a result, unnecessary communications overhead can be minimized for greater parallel processing performance. Once the distribution function is determined, it can be applied to the change record stream of each standby instance.

Focusing on standby instance 160A in particular and referring to FIG. 1C, the distribution function may be applied to map change record stream 184A to a set of change vector maps or "CVMaps". In one embodiment, each change vector map may be implemented as a circular buffer, with logmerger processes appending change vectors to the head and sender/instance merger processes consuming from the tail, with appending and consuming performed in a latchless fashion.

Each change vector map may also have a one-to-one correspondence with a particular apply slave. Thus, change vector map 186A may correspond to changes that will be applied by apply slave 172A, change vector map 186B may correspond to changes that will be applied by apply slave 172B, change vector map 186C may correspond to changes that will be applied by apply slave 172C, and so forth. As change record stream 184A is processed by logmerger 164A, the distribution function is applied to each change record to determine the appropriate change vector map for appending a change vector.

To avoid consuming additional memory, the change records may not be copied but instead referenced to their in-memory locations when creating the change vector maps. For example, if the distribution function assigns a particular change record to apply slave 172I, then a new change vector may be appended to change vector map 186I, wherein the new change vector points to the location of the particular change record within log buffers 180A.

Additionally, global control messages may also be inserted into change vector maps 186A-186I at the time of certain events. One such event is completing the processing of a particular log buffer. For example, during the processing of change record stream 184A, if a particular change vector points to the last change record in a particular log buffer, then a log buffer completion event may be triggered for that particular log buffer. This event causes each and every change vector map 186A-186I to write a global control message indicating that the particular log buffer is done with logmerger processing.

These global control messages can then be used to track apply slave dependencies for log buffers. For example, each log buffer may be initialized with a use count equal to the number of apply slaves (9 for FIG. 1B), wherein the use count is decremented each time a particular apply slave encounters the global control message. Once the use count reaches zero, the log buffer may be marked as available ("unused") or freed, since all of the apply slaves no longer need access to any of the change records from the log buffer.

Other global control messages that may be embedded include an end of all redo strands for a particular standby instance, or a metadata marker as discussed further below.

Accordingly, by processing change record stream 184A using a distribution function, logmerger 164A of standby instance 160A may populate change vector maps 186A-186I. Similarly, by processing a respective change record stream of each instance with the same distribution function, logmerger 164B of standby instance 160B may populate a second set of change vector maps, and logmerger 164C of standby instance 160C may populate a third set of change vector maps.

Sending Change Records

At block 206 of process 200, referring to FIG. 1B, according to the determinations made in block 204, the respective sender process of senders 166A-166I running on standby instances 160A-160C dispatch each change record of at least a portion of the change records stored in block 202 to a standby instance on which the apply process assigned to each change record runs. As discussed above, these change records may be read into buffers and referenced by sets of change vector maps for each standby instance 160A-160C. Focusing specifically on standby instance 160A and referring to FIG. 1C, standby instance 160A may dispatch the portion corresponding to change record stream 184A, which is mapped into change vector maps 186A-186I corresponding to apply slaves 172A-172I respectively. Thus, the change vector maps can be considered as "outboxes" for particular apply slaves.

For change vector maps 186A-186C, dispatching change records to a remote instance is not necessary since apply slaves 172A-172C are already local to standby instance 160A. Thus, as an optimization, the change records can be read directly from log buffers 180A. In this embodiment, there is no need for a local sender and receiver pair for each standby instance, allowing sender 166A and corresponding receiver 168A to be omitted. On the other hand, the change records referenced by change vector maps 186D-186F need to be sent to remote standby instance 160B, and the change records referenced by change vector maps 186G-186I need to be sent to remote standby instance 160C.

Sender processes may consume and dispatch the change vectors to the remote standby instances by moving the change vectors to send buffers 187A and also by copying the referenced change records from log buffers 180A to send buffers 187A. As with log buffers 180A, each buffer within send buffers 187A may be set to a fixed size. Once a buffer is full within send buffers 187A, an appropriate sender process may transfer the full buffer to a corresponding receiver process on a remote standby instance, over network 140 or another communications link. In some cases, a partially filled buffer may also be sent, for example if no more change vector maps are available for the associated standby instance.

To distribute the workload, each sender process may be responsible for dispatching change vectors and change records to one or more specified apply slaves. A corresponding receiver process may be responsible for receiving the dispatched change vectors and change records from each sender process. Based on these responsibilities, each sender process consumes change vectors from corresponding change vector maps of the local standby instance. Each sender and receiver pair may be assigned the responsibility of all or a subset of the apply slaves for a particular instance. An example of such an assignment is summarized in Table 1 below:

TABLE 1

Example Sender to Receiver Assignment

| Sender Process: | Responsible for Apply Slaves: | Sends to Receiver Process: |
| --- | --- | --- |
| Sender 166A | Apply Slaves 172A-172C | Receiver 168A (local) |
| Sender 166B | Apply Slaves 172D-172F | Receiver 168D (remote) |
| Sender 166C | Apply Slaves 172G-172I | Receiver 168G (remote) |
| Sender 166D | Apply Slaves 172A-172C | Receiver 168B (remote) |
| Sender 166E | Apply Slaves 172D-172F | Receiver 168E (local) |
| Sender 166F | Apply Slaves 172G-172I | Receiver 168H (remote) |
| Sender 166G | Apply Slaves 172A-172C | Receiver 168C (remote) |
| Sender 166H | Apply Slaves 172D-172F | Receiver 168F (remote) |
| Sender 166I | Apply Slaves 172G-172I | Receiver 168I (local) |

Thus, focusing on sender 166B for example, sender 166B consumes change vectors from change vector maps 186D, 186E, and 186F, which correspond to apply slaves 172D, 172E, and 172F respectively on standby instance 160B. The consumed change vectors and the referenced change records within log buffers 180A are placed together in a send buffer of send buffers 187A. Once the send buffer is full, then sender 166B can forward the send buffer from standby instance 160A to standby instance 160B over network 140, to be received by receiver 168D. In a similar manner, sender 166D may forward filled send buffers from standby instance 160B to standby instance 160A over network 140, to be received by receiver 168B.

Receiving Change Records

At block 208 of process 200, referring to FIG. 1B, each of receivers 168-168D and 168F-168H receive change records dispatched to said each receiver process by a sender process running on a standby instance different than the standby instance on which said receiver process runs. Referring to Table 1 above, since receivers 168A, 168E, and 168I may receive change vectors from a sender on the same local standby instance, only receivers 168B-168D and 168F-168H may receive change records that are dispatched from sender processes running on a remote standby instance that is different than the standby instance on which each receiver process runs.

Focusing on the example where sender 166D sends a send buffer to receiver 168B, referring to FIG. 1C, receiver 168B may receive change vectors with change records that are contained within a receive buffer of receiver buffers 188A. Since memory 161B of standby instance 160B may be structured similarly to memory 161A of standby instance 160A, memory 161B may also include send buffers 187B (not specifically shown in the Figures). A network communications API may be provided that allows sender 166D to queue a full send buffer from send buffers 187B for sending over network 140, whereby the send buffer is deposited as a corresponding receive buffer within receive buffers 188A, to be received by receiver 168B.

Merging Change Records by Instance

At block 210 of process 200, referring to FIG. 1B, each of standby instances 160A-160C orders a respective plurality of assigned change records assigned to an apply process running on each standby instance, said ordering made according to a logical time associated with each assigned change record of said plurality of assigned change records, wherein each of the respective plurality of assigned change records includes the dispatched change records received in block 208. In other words, the change records received from remote standby instances are merged with the local change records at each standby instance in logical time order. Block 210 may be carried out by each instance merger 170A-170C for respective standby instances 160A-160C.

Focusing on standby instance 160A in particular, instance merger 170A may merge the change records that are received by receivers 168A-168C. In the case of receiver 168A, since the corresponding sender 166A is local to standby instance 160A, the local change records can be directly accessed from log buffers 180A by examining the change vectors within change vector maps 186A-186C. For receivers 168B and 168C, since the corresponding sender 166D and sender 166G are remote to standby instance 160A, the remote change records may found with change vectors that are within receiver buffers 188A, as discussed above with respect to block 208. Instance merger 170A may thus merge together these local and remote change records in logical time order as instance change record stream 192A.

Applying Changes

At block 212 of process 200, referring to FIG. 1B, instance merger 170A-170C on each respective standby instance 160A-160C distributes each assigned change record ordered in block 210 to the assigned apply process of each assigned change record. Since each change vector and referenced change record is known to be retrieved from a particular change vector map, each change record can be routed to the correct apply slave, as defined in the example assignment of Table 1 above.

Focusing again on standby instance 160A, for a given first change vector from instance change record stream 192A, the assigned apply slave checks whether the referenced database block already exists in a buffer cache of memory 161A, for example in a recovery buffer of redo cache 193A. If the referenced database block is in memory, then the changes can be applied immediately to the recovery buffer. After applying, the recovery buffer is linked to the tail of one of checkpoint queues 196A-196C for respective apply slaves 172A-172C.

If the referenced database block is not in memory, then the assigned apply slave issues an asynchronous read request to retrieve the referenced database block from standby database 152 into a new recovery buffer within redo cache 193A of memory 161A. The new recovery buffer is also linked to the tail of one of checkpoint queues 196A-196C for respective apply slaves 172A-172C, the same as with the when the recovery buffer is already in memory. However, the first and future change vectors for the new recovery buffer are stored into redo cache 193A and linked to the tail of pending work queues 194A-194C for respective apply slaves 172A-172C.

In this manner, apply slaves 172A-172C can continue processing instance change record stream 192A without blocking on database I/O, and the pending work queues 194A-194C can be processed in any order since the recovery buffers are already ordered in checkpoint queues 196A-196C. Accordingly, a recovery buffer that has completed asynchronous I/O from standby database 152 may be unlinked from the head of a respective pending work queue 194A-194C after all of the change vectors in redo cache 193A that are pending for the recovery buffer are applied.

Metadata Markers

To accommodate actions that may need a synchronization point, metadata markers (also referred to as "recovery markers") may be embedded within the redo strands. Such actions may include modifications to database storage, for example creating a new tablespace, dropping a tablespace, adding a new data file, deleting a data file, or changing affinities for undo tablespaces. To ensure storage consistency, all changes up to the metadata marker should be processed before processing any changes after the metadata marker. Otherwise, problems such as attempting to apply changes to a non-existing file may occur. Accordingly, when such actions occur on a particular primary instance 120A-120D of primary DBMS 110, they may be written as special metadata markers within the respective redo strand 122A-122D. When any of the logmergers 164A-164C encounters such a metadata marker, the metadata marker may be forwarded to coordinator 162, which in turn sorts the metadata markers from all standby instances in logical time order for processing.

As discussed above, database storage modifications may require a synchronization point to ensure storage consistency. To enforce the synchronization point, the logmerger that encountered the metadata marker may immediately halt merging new change records to its associated change record stream. By extension, senders 166A-166C are also necessarily halted. Note that the logmerger can still continue to read and validate log buffers, but simply does not merge them. Since the instance merger 170A-170C of each standby instance 160A-160C merges the change records received from all instances, this halting naturally results in all standby instances only applying up to the metadata marker point.

Dynamic changes to the redo strands may also embed metadata markers within the redo strands. For example, a new primary instance and corresponding redo strand may be added dynamically to primary DBMS 110. In this case, all changes up to the metadata marker should be processed before the new redo strand is assigned to a logmerger of a particular standby instance, for example by round-robin or load-balancing as discussed above. Otherwise, the change records may not be applied in the correct order.

A failover metadata marker may be embedded if primary DBMS 110 crashes or encounters a serious error. In this case, since physical standby 150 will be acting as a failover for the primary, it should not proceed ahead of the primary by applying change records beyond the crash point. Thus, the failover metadata marker may indicate a synchronization point after which change records should not be applied.

Besides metadata markers, dynamic changes to physical standby 150 may also necessitate a synchronization point. For example, if a new standby instance joins or an existing standby instance drops from physical standby 150, the distribution function may need to be adjusted for the new number of standby instances and apply slaves. Accordingly, a synchronization point may be requested and identified, all changes may be applied until the synchronization point, and the distribution function may be modified, with standby instance processes spawned or removed as necessary. Similarly, changes to undo tablespaces may be propagated using a metadata marker that requests a synchronization point, since changes to the undo tablespaces may correspondingly modify the determination of standby instance affinities in the distribution function.

Not all metadata markers may require synchronization as with the above examples. For example, a crash recovery marker may be used by coordinator 162 to update logical times in file headers, and may not require any synchronization at all. A library cache invalidation marker may be used by coordinator 162 to direct all standby instances to purge their respective library caches. For example, if a table is dropped, then all cached database blocks for that table can be purged. Moreover, because the timing of the purge causes no correctness issues for the redo apply, a synchronization point is not necessary. However, as discussed above, a database storage modification marker may be issued at the time that the table is dropped. Thus, a metadata marker does not necessarily indicate a full synchronization, but more broadly indicates that some special action is to be taken when the metadata marker is encountered.

Tracking Progress

Each standby instance independently tracks the redo apply progress for a particular recovery session at three scope levels: at each apply slave, locally at the standby instance, and globally for all standby instances. The tracked progress metrics are referred to as "influx logical times", which indicate that all change records prior to and up to (but not including) that influx logical time have been applied for a given scope, with the apply state of change records at or after the influx logical time unknown or "influx" for that scope.

At the apply slave level, the slave influx logical time corresponds to the head of the associated pending work queue, or the head of pending work queues 194A-194C for respective apply slaves 172A-172C. If a pending work queue is empty, then the slave influx logical time corresponds to the last logical time seen by that apply slave.

At the local standby instance level, the local influx logical time is maintained as the least of the slave influx logical times for the local standby instance, and is shown as local influx logical time 189A for standby instance 160A.

At the global standby instance level, the global influx logical time corresponds to the least of the local influx logical times for each standby instance, and is shown as global influx logical time 190A for standby instance 160A. Each standby instance may broadcast its own local influx logical time to all other standby instances, allowing each standby instance to independently calculate the same global influx logical time. Alternatively, the global influx logical time may be calculated and broadcast from coordinator 162.

Each standby instance 160A-160C may include any number of database writers, or DB writers 174A-174C, which are each responsible for one or more checkpoint queues. Thus, DB writer 174A may be responsible for checkpoint queues 196A-196C. DB writer 174A consumes from the head of each checkpoint queue 196A-196C, writing recovery buffers to standby database 152. However, DB writer 174A only writes a recovery buffer if it is prior to global influx logical time 190A and not referenced in any of pending work queues 194A-194C. In other words, a recovery buffer is only written to disk after all possible changes have been applied.

Coordinator 162 may broadcast a query logical time to database clients for offloading read-only database queries from primary DBMS 110. If the query logical time is set too aggressively, then excessive waits may result since in-flight transactions may not be committed yet, and undo blocks to roll back the in-flight transactions may not be generated yet, causing the query to wait until the undo is applied and available. Accordingly, the query logical time is set to be no greater than the global influx logical time, which guarantees that all of the changes have already been applied for any query. While this means that data retrieved from the standby may be slightly out of date, this approach may be preferable to avoid high query latencies on the standby.

Recoverable Recovery

To provide recovery from a failure of the recovery process, for example if a particular logmerger crashes, a process monitor (PMON) may run in the background for each standby instance that can detect a hung or crashed process and examine the process memory to ascertain the crash logical time or the local influx logical time at the time of the crash. This crash logical time may be written to a special control file, and coordinator 162 may be notified that a crash has occurred. Coordinator 162 may then direct all standby instances to halt recovery and to recover to a clean logical time before resuming normal recovery. More specifically, the clean logical time may be set to the current global influx logical time, excluding the crashed instance. If the standby instance with the coordinator crashes, then the other standby instances may periodically attempt to access the special control file to confirm that a crash occurred and act accordingly.

Thus, each of the standby instances may restart recovery, applying a recovery subset of changes to standby database 152 that includes change records from the crash logical time until the clean logical time. Note that the recovery subset of changes excludes any change records at or beyond the clean logical time. After the recovery subset of change records is applied and written to disk, standby database 152 is in a clean state, and normal recovery or redo apply may resume with the pending change records.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
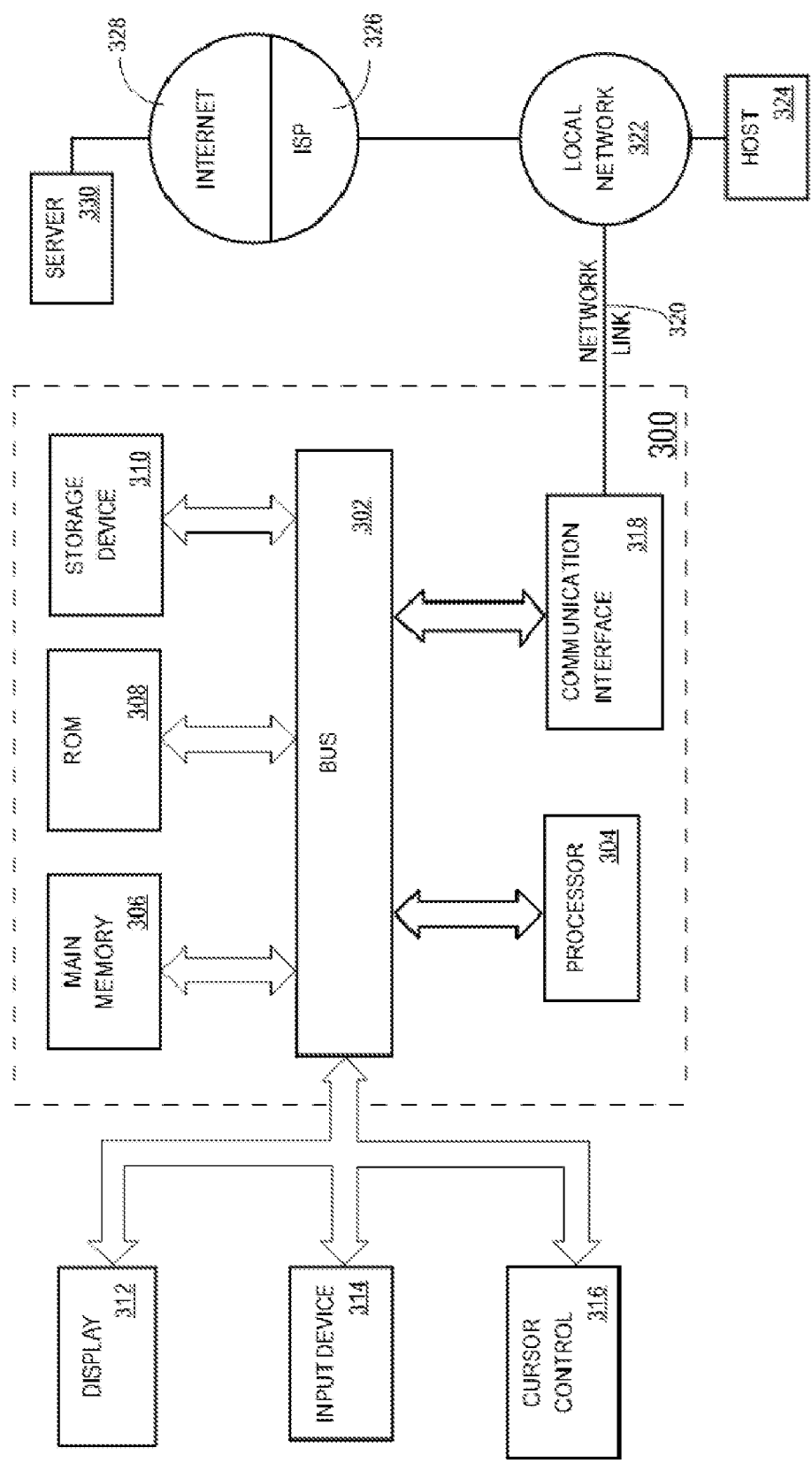
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
on each standby instance of a plurality of standby instances for a standby database:
an apply process of a plurality of apply processes running on said each standby instance to apply change records to said standby database;
a sender process of a plurality of sender processes running on said each standby instance to transmit change records to at least one receiver process of a plurality of receiver processes;
a receiver process of said plurality of receiver processes running on said each standby instance to receive change records transmitted by at least one sender process of said plurality of sender processes to said receiver process;
each standby instance of said plurality of standby instances:
storing a plurality of change records received from one or more primary instances for a primary multi-instance database;
making determinations of how to assign said plurality of change records to said plurality of apply processes, each determination of said determinations assigning a change record of said plurality of change records to an apply process of said plurality of apply processes;
according to said determinations, the respective sender process of said plurality of sender processes running on said each standby instance dispatching each change record of at least of a portion of said plurality of change records to a standby instance on which the apply process assigned to said each change record runs;

each receiver process of said plurality of receiver processes receiving dispatched change records dispatched to said each receiver process by a sender process running on a standby instance different than the standby instance on which said each receiver process runs;

each standby instance of said plurality of standby instances ordering a respective plurality of assigned change records assigned to an apply process running on said each standby instance, said ordering made according to a logical time associated with each assigned change record of said plurality of assigned change records, said respective plurality of assigned change records including dispatched change records that are received by a receiver process of said plurality of receiver processes running on said each standby instance and that are transmitted by a sender process of said plurality of sender processes running on a different standby instance of said plurality of standby instances;

each standby instance of said plurality of standby instances distributing each assigned change record of the respective plurality of assigned change records to the assigned apply process of said each assigned change record.

2. The method of claim 1, further comprising:
for each standby instance of said plurality of standby instances:
maintaining a local influx logical time such that said respective plurality of assigned change records are applied up to said local influx logical time;
for a particular standby instance of said plurality of standby instances:
maintaining a global influx logical time corresponding to a smallest of said local influx logical time of said plurality of standby instances.

3. The method of claim 2, further comprising:
for a particular standby instance of said plurality of standby instances:
providing a response to a read request for said standby database that is consistent to a query logical time that is no greater than said global influx logical time.

4. The method of claim 2, further comprising:
ascertaining for a standby instance of said plurality of standby instances that crashed, a crash logical time, and a clean logical time corresponding to said global influx logical time;
for a recovery subset of the respective plurality of change records of said standby instance that crashed, restarting determinations of how to assign said recovery subset to said plurality of apply processes, said recovery subset including change records having logical times from said crash logical time until said clean logical time; and
resuming said determinations for the respective plurality of change records of said standby instance that had crashed.

5. The method of claim 1, wherein each change record of each respective plurality of change records of said plurality of standby instances is associated with a particular database block address (DBA), and wherein for each standby instance of said plurality of standby instances:
each determination of said determinations distributes a change record of the respective plurality of change records of said each standby instance to an apply process of said apply processes based on a distribution function on said DBA associated with said each change record.

6. The method of claim 5, wherein said distribution function is based on a hash function.

7. The method of claim 5, wherein for each standby instance of said plurality of standby instances said distribution function further distributes each change record of the respective plurality of change records according to the respective DBA associated with said each change record having an affinity for a particular standby instance of said plurality of standby instances.

8. The method of claim 7, wherein for each standby instance of said plurality of standby instances said distribution function further distributes each change record of the respective plurality of change records according to the respective DBA associated with said each change record having an affinity for a undo tablespace on a particular standby instance of said plurality of standby instances.

9. The method of claim 5, wherein for each standby instance of said plurality of standby instances said distribution function further distributes a change record of the respective plurality of change records locally to said each standby instance for direct loads.

10. The method of claim 5, wherein for each standby instance of said plurality of standby instances said distribution function further distributes change records of the respective plurality of change records such that each plurality of standby instances receives change records within a contiguous range of DBAs.

11. The method of claim 1, further comprising:
for a particular standby instance of said plurality of standby instances:
reading a metadata marker from said plurality of change records;
halting said dispatching until said plurality of apply processes applies all change records from said plurality of change records having a logical time prior to a logical time of said metadata marker.

12. The method of claim 1, further comprising:
for a particular standby instance of said plurality of standby instances:
reading a metadata marker from said plurality of change records;
forwarding said metadata marker to be sorted and applied by a coordinator process of a master coordinator instance of said plurality of standby instances.

13. The method of claim 12, wherein said metadata marker is a library cache invalidation marker, and wherein the coordinator process instructs each of the plurality of standby instances to purge a respective library cache.

14. The method of claim 1, wherein said logical time is a system commit number (SCN).

15. A standby database comprising one or more computing devices, the standby database including:
a plurality of standby instances each configured to run:
an apply process of a plurality of apply processes to apply change records to said standby database;
a sender process of a plurality of sender processes to transmit change records to at least one receiver process of a plurality of receiver processes;
a receiver process of said plurality of receiver processes to receive change records transmitted by at least one sender process of said plurality of sender processes to said receiver process;

each standby instance of said plurality of standby instances further configured to:
  store a plurality of change records received from one or more primary instances for a primary multi-instance database;
  make determinations of how to assign said plurality of change records to said plurality of apply processes, each determination of said determinations assigning a change record of said plurality of change records to an apply process of said plurality of apply processes;
  according to said determinations, the respective sender process of said plurality of sender processes running on said each standby instance dispatching each change record of at least of a portion of said plurality of change records to a standby instance on which the apply process assigned to said each change record runs;
each receiver process of said plurality of receiver processes configured to receive dispatched change records dispatched to said each receiver process by a sender process running on a standby instance different than the standby instance on which said each receiver process runs;
each standby instance of said plurality of standby instances further configured to order a respective plurality of assigned change records assigned to an apply process running on said each standby instance, said ordering made according to a logical time associated with each assigned change record of said plurality of assigned change records, said respective plurality of assigned change records including dispatched change records that are received by a receiver process of said plurality of receiver processes running on said each standby instance and that are transmitted by a sender process of said plurality of sender processes running on a different standby instance of said plurality of standby instances;
each standby instance of said plurality of standby instances further configured to distribute each assigned change record of the respective plurality of assigned change records to the assigned apply process of said each assigned change record.

16. The standby database of claim 15, wherein:
each standby instance of said plurality of standby instances is further configured to:
  maintain a local influx logical time such that said respective plurality of assigned change records are applied up to said local influx logical time;
a particular standby instance of said plurality of standby instances is configured to:
  maintain a global influx logical time corresponding to a smallest of said local influx logical time of said plurality of standby instances;
  provide a response to a read request for said standby database that is consistent to a query logical time that is no greater than said global influx logical time.

17. The standby database of claim 15, wherein each change record of each respective plurality of change records of said plurality of standby instances is associated with a particular database block address (DBA), and wherein for each standby instance of said plurality of standby instances:
  each determination of said determinations distributes a change record of the respective plurality of change records of said each standby instance to a particular apply process of said apply processes based on a distribution function on said DBA associated with said each change record, wherein said distribution function further distributes said each change record of the respective plurality of change records according to said DBA having for an affinity for said particular standby instance.

18. One or more non-transitory computer-readable storage media, storing instructions which, when executed by one or more processors, cause:
on each standby instance of a plurality of standby instances for a standby database:
  an apply process of a plurality of apply processes running on said each standby instance to apply change records to said standby database;
  a sender process of a plurality of sender processes running on said each standby instance to transmit change records to at least one receiver process of a plurality of receiver processes;
  a receiver process of said plurality of receiver processes running on said each standby instance to receive change records transmitted by at least one sender process of said plurality of sender processes to said receiver process;
each standby instance of said plurality of standby instances:
  storing a plurality of change records received from one or more primary instances for a primary multi-instance database;
  making determinations of how to assign said plurality of change records to said plurality of apply processes, each determination of said determinations assigning a change record of said plurality of change records to an apply process of said plurality of apply processes;
  according to said determinations, the respective sender process of said plurality of sender processes running on said each standby instance dispatching each change record of at least of a portion of said plurality of change records to a standby instance on which the apply process assigned to said each change record runs;
each receiver process of said plurality of receiver processes receiving dispatched change records dispatched to said each receiver process by a sender process running on a standby instance different than the standby instance on which said each receiver process runs;
each standby instance of said plurality of standby instances ordering a respective plurality of assigned change records assigned to an apply process running on said each standby instance, said ordering made according to a logical time associated with each assigned change record of said plurality of assigned change records, said respective plurality of assigned change records including dispatched change records that are received by a receiver process of said plurality of receiver processes running on said each standby instance and that are transmitted by a sender process of said plurality of sender processes running on a different standby instance of said plurality of standby instances;
each standby instance of said plurality of standby instances distributing each assigned change record of the respective plurality of assigned change records to the assigned apply process of said each assigned change record.

19. The one or more non-transitory computer-readable storage media of claim 18, storing instructions which, when executed by the one or more processors, further cause:
for each standby instance of said plurality of standby instances:

maintaining a local influx logical time such that said respective plurality of assigned change records are applied up to said local influx logical time;

for a particular standby instance of said plurality of standby instances:

maintaining a global influx logical time corresponding to a smallest of said local influx logical time of said plurality of standby instances;

providing a response to a read request for said standby database that is consistent to a query logical time that no greater than said global influx logical time.

20. The one or more non-transitory computer-readable storage media of claim 19, storing instructions which, when executed by the one or more processors, further cause:

for a particular standby instance of said plurality of standby instances:

providing a response to a read request for said standby database that is consistent to a query logical time that is no greater than said global influx logical time.

21. The one or more non-transitory computer-readable storage media of claim 19, storing instructions which, when executed by the one or more processors, further cause:

ascertaining for a standby instance of said plurality of standby instances that crashed, a crash logical time, and a clean logical time corresponding to said global influx logical time;

for a recovery subset of the respective plurality of change records of said standby instance that crashed, restarting determinations of how to assign said recovery subset to said plurality of apply processes, said recovery subset including change records having logical times from said crash logical time until said clean logical time; and resuming said determinations for the respective plurality of change records of said standby instance that had crashed.

22. The one or more non-transitory computer-readable storage media of claim 18, wherein each of said plurality of change records is associated with a particular database block address (DBA), and wherein for each standby instance of said plurality of standby instances:

each determination of said determinations distributes each change record of said plurality of change records to said assigned apply process of said apply processes based on a distribution function on said DBA associated with said each change record, wherein said distribution function further distributes each said plurality of change records according to said DBA having an affinity to a standby instance on which said assigned apply process runs.

23. The one or more non-transitory computer-readable storage media of claim 20, wherein said distribution function is based on a hash function.

24. The one or more non-transitory computer-readable storage media of claim 20, wherein for each standby instance of said plurality of standby instances said distribution function further distributes each change record of the respective plurality of change records according to the respective DBA associated with said each change record having an affinity for a undo tablespace on a particular standby instance of said plurality of standby instances.

25. The one or more non-transitory computer-readable storage media of claim 18, wherein each change record of each respective plurality of change records of said plurality of standby instances is associated with a particular database block address (DBA), and wherein for each standby instance of said plurality of standby instances:

each determination of said determinations distributes a change record of the respective plurality of change records of said each standby instance to an apply process of said apply processes based on a distribution function on said DBA associated with said each change record.

26. The one or more non-transitory computer-readable storage media of claim 23, wherein for each standby instance of said plurality of standby instances said distribution function further distributes a change record of the respective plurality of change records locally to said each standby instance for direct loads.

27. The one or more non-transitory computer-readable storage media of claim 23, wherein for each standby instance of said plurality of standby instances said distribution function further distributes change records of the respective plurality of change records such that each plurality of standby instances receives change records within a contiguous range of DBAs.

28. The one or more non-transitory computer-readable storage media of claim 18, storing instructions which, when executed by the one or more processors, further cause:

for a particular standby instance of said plurality of standby instances:

reading a metadata marker from said plurality of change records;

halting said dispatching until said plurality of apply processes applies all change records from said plurality of change records having a logical time prior to a logical time of said metadata marker.

29. The one or more non-transitory computer-readable storage media of claim 18, storing instructions which, when executed by the one or more processors, further cause:

for a particular standby instance of said plurality of standby instances:

reading a metadata marker from said plurality of change records;

forwarding said metadata marker to be sorted and applied by a coordinator process of a master coordinator instance of said plurality of standby instances.

30. The one or more non-transitory computer-readable storage media of claim 29, wherein said metadata marker is a library cache invalidation marker, and wherein the coordinator process instructs each of the plurality of standby instances to purge a respective library cache.

31. The one or more non-transitory computer-readable storage media of claim 18, wherein said logical time is a system commit number (SCN).

* * * * *

UNITED STATES PATENT AND TRADEMARK OFFICE
CERTIFICATE OF CORRECTION

PATENT NO. : 9,767,178 B2
APPLICATION NO. : 14/067129
DATED : September 19, 2017
INVENTOR(S) : Srivastava et al.

Page 1 of 1

It is certified that error appears in the above-identified patent and that said Letters Patent is hereby corrected as shown below:

In the Claims

In Column 23, Line 51, in Claim 23, delete "claim 20," and insert -- claim 22, --, therefor.

In Column 23, Line 54, in Claim 24, delete "claim 20," and insert -- claim 22, --, therefor.

In Column 24, Line 16, in Claim 26, delete "claim 23," and insert -- claim 25, --, therefor.

In Column 24, Line 22, in Claim 27, delete "claim 23," and insert -- claim 25, --, therefor.

Signed and Sealed this
Twenty-second Day of May, 2018

Andrei Iancu
*Director of the United States Patent and Trademark Office*